United States Patent
Strand et al.

(10) Patent No.: US 7,052,637 B1
(45) Date of Patent: ***May 30, 2006

(54) MANUFACTURING OF COMPONENTS FOR VALVE MECHANISMS FOR INTERNAL COMBUSTION ENGINES

(75) Inventors: Kent Strand, Linköping (SE); Sven-Åke Karlsson, Linköping (SE); Stefan Ekblad, Nödinge (SE)

(73) Assignee: Saab AB, Linköping (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/276,683

(22) PCT Filed: May 17, 2000

(86) PCT No.: PCT/SE00/00980

§ 371 (c)(1),
(2), (4) Date: Mar. 19, 2003

(87) PCT Pub. No.: WO01/87524

PCT Pub. Date: Nov. 22, 2001

(51) Int. Cl.
*B29C 67/00* (2006.01)
(52) U.S. Cl. ........................ 264/148; 264/162
(58) Field of Classification Search ................ 264/148, 264/162
See application file for complete search history.

(56) References Cited

U.S. PATENT DOCUMENTS

| | | | |
|---|---|---|---|
| 4,818,633 A | | 4/1989 | Dinwoodie et al. |
| 4,908,923 A | * | 3/1990 | Anderson et al. ........ 29/888.01 |
| 5,154,425 A | * | 10/1992 | Niskanen et al. ........... 473/342 |
| 5,354,528 A | | 10/1994 | Akiyama et al. |
| 5,511,603 A | * | 4/1996 | Brown et al. ................. 164/97 |
| 6,102,635 A | * | 8/2000 | Strand et al. ............... 409/131 |
| 6,216,561 B1 | * | 4/2001 | Dischler .................... 76/104.1 |
| 6,293,741 B1 | * | 9/2001 | Strand et al. ............... 409/131 |
| 6,435,979 B1 | * | 8/2002 | Mounfield, Jr. ............. 473/324 |
| 6,779,245 B1 | * | 8/2004 | Strand et al. .............. 29/527.6 |

FOREIGN PATENT DOCUMENTS

WO WO 00/29151 5/2000

OTHER PUBLICATIONS

G. Lesik et al., Machinability of Alumina/Aluminum Metal Matrix, Composites, Tufts University Conference: Advances in Production and Fabrication of Light Metals and Metal Matrix Composites, Canada Aug. 23-27, 1992 Publ., pp. 673-687.

CT Lane, Requirements for Machining MMC Castings, AFS Transactions, vol. 101, Apr. 1994 conference, pp. 525-529.

(Continued)

*Primary Examiner*—Edmund H. Lee
(74) *Attorney, Agent, or Firm*—Bingham McCutchen LLP

(57) ABSTRACT

A method for fabricating components such as rocker arms (4), cam followers (3) or cams for valve mechanisms for combustion engines, in which a billet of an MMC material (Metal Matrix Composite) containing 10–70% ceramic material by volume in the form of particles or fibers is extruded into a bar (1, 2) having the cross-sectional profile of the final component (3, 4), and where separate billets for the respective components (3, 4) are obtained by cross-cutting the bar (1, 2) by means of cutting via high-speed machining, HSM.

4 Claims, 1 Drawing Sheet

OTHER PUBLICATIONS

Conference paper: 30${}^{th}$ ISIATA, ISBN 0-947719-94-6, Materials for Engergy-Afficient Vehicles; Paint and Powder Coating Application in the Automotive Industries, Jun. 1997, pp. 445-452.

* cited by examiner

MANUFACTURING OF COMPONENTS FOR VALVE MECHANISMS FOR INTERNAL COMBUSTION ENGINES

TECHNICAL FIELD

This invention concerns an optimized valve mechanism design for combustion engines realized through the use of valve components, preferably rocker arms, cams and cam followers, made of an MMC (Metal Matrix Composite) material, and a method for fabricating such valve components.

STATE OF THE ART

Legislation and competition are pushing vehicle makers to constantly improve performance in terms of fuel consumption, emissions, vibrations, noise, comfort, etc. Decreased weight is essential in all of these contexts, particularly with respect to unsprung mass and in fast-moving components. The valve mechanisms for both Otto and diesel engines contain components whose weight reduction is of major importance in reducing fuel consumption, emissions and noise. Rocker arms and cams are typical of such components. They are currently made of toughened iron or hardened/case-hardened steel, and a changeover to a light, strong and wear-resistant material is thus of potential interest.

The use of MMC material is proposed in the invention described below. Commercial interest in structural materials of the type known generally as MMC materials ("metall-matris-kompositer" in Swedish) increased during the 1990s. MMC materials are composites that consist of a binding material in the form of a metal such as aluminum, magnesium, titanium or alloys thereof that is reinforced through the admixture of fibers or particles in the form of ceramic substances such as silicon carbide, boron carbide or aluminum oxide so that they account for 10% to 70% of the material by volume. For the sake of clarity, it should be noted here that a type of steel may also serve as the base material.

MMC materials exhibit extremely interesting properties, which can be further adapted depending on the area of application, thus offering advantages in that the component can be made lighter, stronger, stiffer and possessed of better fatigue properties than can be achieved using conventional materials within the specific area of application in question.

One significant disadvantage associated with the use of MMC materials is that they are very difficult to machine. To create a component made of MMC material, methods are usually used in which the component is cast in a shape that is closely akin to the final shape of the component. Another method involves using a forged billet or a piece of extruded bar, so that spark machining of the surface and conventional cutting techniques can be used to produce the final component shape. Attempts have been made to produce e.g. connecting rods for motorcycles by means of such conventional fabricating and machining methods. In this way, the goal of achieving the desired component and its desired properties, such as lower weight, has been achieved, and the use of such connecting rods in an engine has resulted in an engine that turns more readily and vibrates less. However, the problem is that the cost of producing engine components by conventional means has been extremely high, thereby limiting use to areas where cost is of lesser importance.

A number of patents document various methods for the final forming of components based on MMC materials. U.S. Pat. No. 5,765,667 may be cited as an example of such a patent, wherein a method is described for fabricating a component, in this case a brake disk, by casting to a format that is as close as possible to the shape of the finished component in order, as is clearly described, to avoid the need for machine cutting to the greatest possible extent. It is obvious to one skilled in the art to avoid the need for cutting operations, since MMC material contains, when consisting of e.g. an aluminum base and reinforcing particles of silicon carbide, the very substances that are commonly used to grind cutting tools. The silicon carbide particles imbedded in the MMC material have a destructive effect on cutting tools when conventional cutting methods are used, since the edges of the cutting tools are rapidly worn down by the abrasive particles in the composite material.

DESCRIPTION OF THE INVENTION

Patent application PCT/SE/02007, which was not yet published at the time of the submission of the present application, presents a method that shows that MMC materials can be machined by HSM (High-Speed Machining), and this method was used in the fabrication of products related to the present invention. Everything described in patent application PCT/SE/02007 is hereby incorporated into the present patent application.

One aspect of the present invention concerns components for valve mechanisms for combustion engines, preferably rocker arms and cams, wherein the components are made of an MMC (Metal Matrix Composite) material of a type such that the base metal of the MMC material and the volume proportion of reinforcement phase are adjusted in view of properties required of the component in question.

According to another aspect of the invention, a method is described for fabricating valve components made of MMC material in which the components are formed by extruding a billet of MMC material to produce a bar with a profile whose cross-section essentially corresponds to that of the finished component. The components are then cross-cut from the extruded bar by cutting via high-speed machining, HSM, as defined below and in patent application PCT/SE/02007.

According to this aspect of the invention, a light-metal-based, particle-reinforced metal-matrix composite (MMC) is used as the structural material. Using this type of material, the properties of various components can be tailored through the choices made in terms of the matrix material base, the type and volume proportion of the reinforcement phase, and the method of fabrication. In the event that the component is a rocker arm, low weight and high fatigue strength are required, and the resistance to wear must also be high. The high-temperature strength must be better than that of, e.g. aluminum alloys. A number of MMC materials are currently available, and several of them are considered suitable for relevant applications. The MMC material used for components as per the foregoing should preferably consist of an aluminum alloy as the base material with a reinforcement phase consisting of aluminum oxide, silicon carbide or boron carbide.

Additional advantages of using MMC materials in the aforesaid components are obtained in that a high modulus of elasticity contributes to a rigid design while retaining the low weight of aluminum. High abrasion resistance also reduces component wear.

The use of MMC materials in components of the aforesaid type thus offers major opportunities for improvement in areas that are of importance in the automotive industry.

However, the price level for MMC materials is, and is likely to remain, considerably higher (by a factor of roughly 10) than the price level for the materials currently being used. Advanced equipment and methods are needed to machine MMC materials. However, this invention creates opportunities for fabricating components in a way that requires as little material consumption and machining as possible. Using the described method of fabricating components by cutting them from an extruded bar using high-speed-machining techniques, it becomes possible to make components out of MMC in larger series with cost-effective production methods, which was not formerly possible.

The invention is based on the fact that the MMC materials make possible an optimized valve mechanism design that is realized by choosing the materials and geometric configuration used based on the requirements established for the engine application in question, i.e. whether the engine is intended for, e.g. a motorcycle, car, race car, boat, truck, work machine, etc. For example, rocker arms and cams made of aluminum-based MMC will generally offer the following advantages as compared to corresponding components made of other materials:

relative to steel:
  lower mass
  better heat conduction
relative to titanium:
  lower mass
  higher specific stiffness
  better wear resistance
  better heat conduction
relative to aluminum:
  greater stiffness
  higher yield point
  higher fatigue strength
  better adaptation to thermal linear expansion of steel
  better wear resistance
  better high-temperature strength
relative to fiber composite: lower price, isotropic properties, thermal linear expansion like that of steel in a connected engine component, better heat conduction, better heat resistance.

The foregoing assertions concerning the use of MMC components apply to all types of means of conveyance, i.e. not only within the automobile industry, but to an equally great extent in e.g. airplanes and helicopters.

DESCRIPTION OF EMBODIMENTS

A number of exemplary embodiments of the invention are described below with reference to the accompany figures.

When fabricating a component made of MMC material for use in a combustion engine valve mechanism as per the foregoing, a method is used in which the component is created by extruding a lump of the selected MMC material into a rod 1, 2 with a profile whose cross-section essentially corresponds to that of the cross-section of the finished component 3, 4. The component 3, 4 is then cross-cut from the extruded bar 1, 2 by cutting via high-speed machining, HSM, as defined below and in patent application PCT/SE02007. The cutting is performed by milling, or by a combination of cross-cutting and milling.

Figure 1:
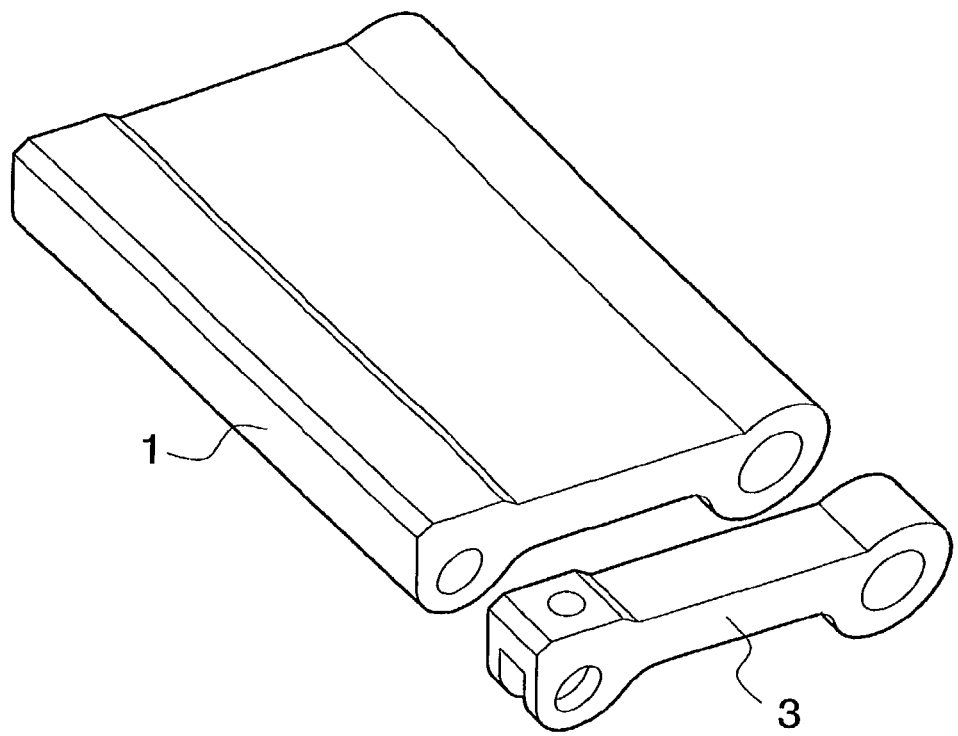
FIG. 1 shows a bar of MMC material from which cam followers for a valve mechanism are being cut.

FIG. 1 shows, as an example, a cam /sic/ 3 that is being cross-cut from the bar 1, which exhibits the cam /sic/ cross-section along the entire bar 1.

Figure 2:
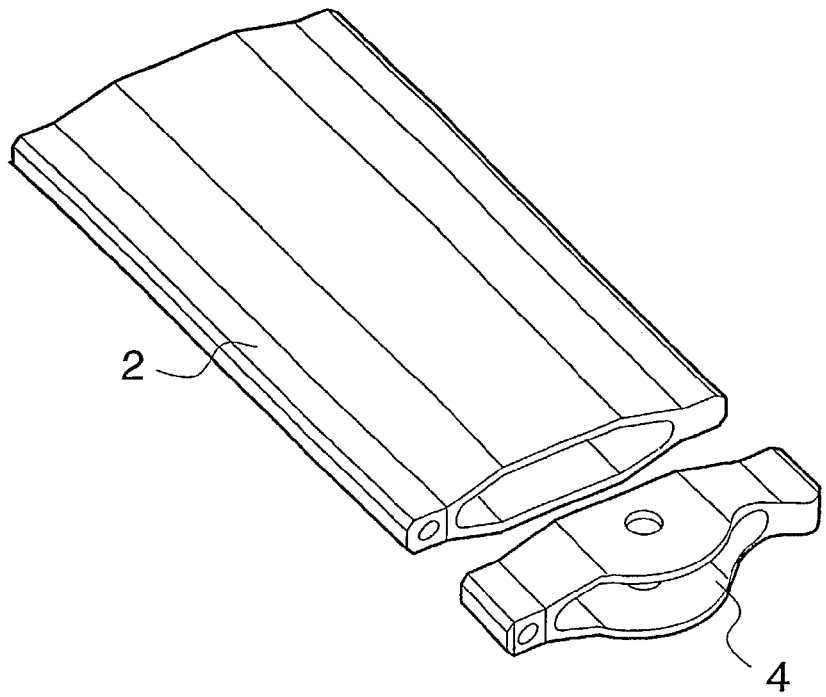
FIG. 2 shows a bar of MMC material from which rocker arms for a valve mechanism are being cut.

FIG. 2 shows, in a corresponding manner, a rocker arm 4 being cross-cut from the bar 2, the entirety of which bar 2 exhibits a cross-section that is the same as a cross-section through the rocker arm 4.

One aspect of the invention is based on a method of working a billet of MMC material by means of what is referred to here as HSM, or High-Speed Machining, and a component can be given its final form directly from the billet by means of this method. The billet can be forge or cast, or may consist of a piece of extruded bar or a raw material produced in some other way.

High-speed machining is characterized in that the cutting tool achieves extremely high speeds in relation to the machined billet in comparison with conventional techniques. The cutting tools that are relevant in this context are preferably milling tools and drills.

In this document, the term high-speed machining (HSM) is used to denote a method that differs from conventional machining methods. It so happens that this term is also sometimes used to denote conventional machining in which new methods are being developed to push the limits of conventional machining data upwards. This is not the sense of the term as it is used herein.

HSM is characterized by:
  extremely high cutting speeds
  a high rate of shear elongation (ability to separate a cutting from the billet)
  a very high power density is achieved in front of the cut (typical values: $MW/mm_3$)
  extremely high local temperatures prevail at the cutting point during the cutting-producing process
  the cuttings flow without coming into contact with the cut,
  the cutting forces tend asymptotically toward zero.

The following examples of the high cutting speeds associated with the machining of various substances may be noted:
  aluminum: ca. 3000 m/minute (conventionally ca. 100–400 m/minute),
  titanium: ca. 15,000 m/minute (conventionally ca. 15–100 m/minute).

Finding the right cutting speed to produce the foregoing conditions that characterize HSM thus depends entirely on the material to be machined. The cutting forces can be studied in connection with testing to determine the optimum cutting speed for HSM of a new material. These forces tend asymptotically toward zero as the criteria for HSM conditions are met. HSM conditions may thus be said to prevail when the cutting forces are diminishing. Under such conditions, it then remains to determine an optimum cutting speed for the material being machined. In conventional machining, the cutting forces increase with increasing cutting speeds.

Yet another advantage of using HSM is that the cuttings absorb the bulk, typically about 80%, of the heat generated at the cutting point, so that a work piece will be left largely unaffected by the heat generated during machining.

HSM has been shown to yield unexpectedly good results when used on MMC materials. Despite the high proportion of abrasive particles in such material, the cutting tools are found to retain their sharpness for a long time, as though unaffected by the abrasives in the MMC material. The reason for this has not been fully explained, since the internal process, i.e. what actually happens to the MMC material at the cutting point during machining, is not entirely understood. One theory is that a cutting being cut from the material is brought to some extent into a liquid state in a small area immediately in front of the edge of the cutting tool, and that the abrasive particles imbedded in the material in the form of e.g. silicon carbide, boron carbide or aluminum oxide are carried away in the molten material and thus do not come into direct contact with the cut. This could explain why the cutting tools retaining their sharpness, in direct contrast to what occurs during conventional cutting operations.

A number of tests have been conducted to evaluate the method according to the invention. Among other tests, a flange was produced from a raw billet of an MMC material, with a mill being used to remove all the material from the raw billet around the remaining flange. The flange in this case was L-shaped, with a final thickness of 1 mm of material, and the sides of the flange measured 45 and 15 mm, respectively. The values used during the machining in this example were: spindle speed 15,000 rpm, cutting speed 565 m/minute and feed speed 300 mm/minute. It took 2.5 minutes to create the flange. The tool life of the cutting tool was measured in hours. The proportion of SiC in the material was 40% in this example.

Tests were also conducted in which holes were drilled in MMC material containing 40% SiC. A number of holes were drilled using 6.9 mm HM drills, with a spindle speed of 15,000 rpm and a feed speed of 3000 mm/minute. The drill tool life was such that one drill could be used to drill 1000 holes.

The good results obtained in connection with machining according to the proposed method were produced using cutting tools of coated hard metal with internal duct cooling, and with diamond tools. When diamond tools are used, the tool lives of the tools are long at carbide contents of up to 40% in the MMC material. Good results are still obtained at carbide contents of as high as 70% in the MMC material.

The method according to the invention is applicable to all types of components that are to be made from MMC materials in cases where machine cutting is feasible in view of the final shape of the component. The method is thus not limited to the depicted embodiments, but can be used in connection with any components where the choice of MMC as the material is advantageous.

The invention claimed is:

1. A method for fabricating a valve mechanism component for combustion engines, comprising:
   extruding a billet of a metal matrix composite (MMC) material containing 10% to 70% ceramic material by volume in the form of particles of fibers into a bar that has a cross-sectional profile that essentially coincides with the desired cross-sectional profile of the fabricated valve mechanism component;
   obtaining separate billets for respective components by cross-cutting the bar by of cutting via high-speed machining, wherein said high-speed machining is characterized in that a very high power density is achieved in front of the cut and in that cutting forces tend asymptotically toward zero;
   machining the component into its final form by cutting via high-speed machining, HSM.

2. A method according to claim 1, wherein the cross-cutting of the bar is carried out using a side-milling cutter or saw blade.

3. A method according to claim 1, wherein the final forming of the separate billet for the intended component is carried out via milling.

4. A method according to claim 1, wherein the valve mechanism component for combustion engines is a rocker arm, a cam follower, or a cam.

\* \* \* \* \*